(12) United States Patent
Notaro et al.

(10) Patent No.: US 9,074,617 B2
(45) Date of Patent: Jul. 7, 2015

(54) SECURITY FASTENER FOR WHEELS WITH A RECESS HOLE

(75) Inventors: David F. Notaro, Amherst, NY (US); Ingo Albs, Untergruppenbach (DE)

(73) Assignee: McGard LLC, Orchard Park, NY (US)

( * ) Notice: Subject to any disclaimer, the term of this patent is extended or adjusted under 35 U.S.C. 154(b) by 284 days.

(21) Appl. No.: 12/908,937

(22) Filed: Oct. 21, 2010

(65) Prior Publication Data

US 2011/0116891 A1 May 19, 2011

Related U.S. Application Data

(60) Provisional application No. 61/255,616, filed on Oct. 28, 2009, provisional application No. 61/373,895, filed on Aug. 16, 2010.

(51) Int. Cl.
*F16B 41/00* (2006.01)
*F16B 37/14* (2006.01)
*F16B 31/02* (2006.01)

(52) U.S. Cl.
CPC .............. *F16B 41/005* (2013.01); *F16B 37/14* (2013.01); *F16B 31/021* (2013.01)

(58) Field of Classification Search
USPC .................. 411/910, 402, 403, 3, 5, 429, 430
See application file for complete search history.

(56) References Cited

U.S. PATENT DOCUMENTS

| 1,243,799 | A | * | 10/1917 | Bissell | 411/397 |
|---|---|---|---|---|---|
| 3,174,383 | A | * | 3/1965 | Heil | 411/405 |
| 3,492,841 | A | * | 2/1970 | Ipri | 70/231 |
| 4,302,137 | A | * | 11/1981 | Hart | 411/432 |
| 4,326,740 | A | * | 4/1982 | Guiler | 292/307 B |
| 4,408,936 | A | * | 10/1983 | Williamson | 411/3 |
| 4,502,825 | A | * | 3/1985 | Yamada | 411/5 |
| 4,504,180 | A | * | 3/1985 | Ishii et al. | 411/5 |
| 4,618,299 | A | | 10/1986 | Bainbridge et al. | |
| 4,726,723 | A | | 2/1988 | Bainbridge | |
| 4,824,305 | A | | 4/1989 | McCauley | |
| 4,897,008 | A | | 1/1990 | Parks | |
| 4,968,202 | A | | 11/1990 | Lanham | |
| 5,112,176 | A | | 5/1992 | McCauley et al. | |
| 5,324,149 | A | | 6/1994 | Bainbridge et al. | |
| 5,360,304 | A | | 11/1994 | Notaro et al. | |
| 5,713,705 | A | * | 2/1998 | Grunbichler | 411/5 |
| 5,730,567 | A | | 3/1998 | Haseley et al. | |
| 5,803,690 | A | * | 9/1998 | Savinsky | 411/432 |

(Continued)

OTHER PUBLICATIONS

EPO, "Extended European Search Report", Counterpart EPO Application No. 10188662.0, Jul. 4, 2012, 7 pages.

(Continued)

*Primary Examiner* — Flemming Saether
(74) *Attorney, Agent, or Firm* — Walter W. Duft

(57) ABSTRACT

A security fastener is for installation on a wheel having a recess hole. The security fastener includes a first end portion and a second medial portion. The first end portion is arranged so that it will be exposed outside, at or inside an entrance to the recess hole when the fastener is installed on the wheel, and has a security feature that resists fastener removal using conventional tools to grip the first end portion. The second medial portion has an external key-receiving lock pattern and is arranged so that a side wall region thereof will extend within the recess hole when the fastener is installed. The lock pattern is provided on the sidewall region and will be exposed outside, at or inside the entrance to the recess hole.

16 Claims, 8 Drawing Sheets

(56) References Cited

U.S. PATENT DOCUMENTS

| | | | |
|---|---|---|---|
| 5,928,236 A * | 7/1999 | Augagneur et al. | 606/305 |
| 6,146,070 A * | 11/2000 | Koma | 411/5 |
| 6,719,511 B2 | 4/2004 | Notaro et al. | |
| 6,739,631 B2 * | 5/2004 | Smith et al. | 285/337 |
| 6,764,114 B1 * | 7/2004 | Guillon | 292/307 R |
| 6,860,177 B2 * | 3/2005 | Bugatti | 81/176.15 |
| 7,351,020 B1 | 4/2008 | Notaro et al. | |
| 7,445,414 B1 | 11/2008 | Notaro et al. | |
| 7,846,187 B2 * | 12/2010 | Jackson | 606/270 |
| 2004/0046389 A1 | 3/2004 | Smith et al. | |

OTHER PUBLICATIONS

Epo, "Communication pursuant to Article 94(3)", Counterpart EPO Application No. 10188662.0, 8/7/132, 12 pages.

* cited by examiner

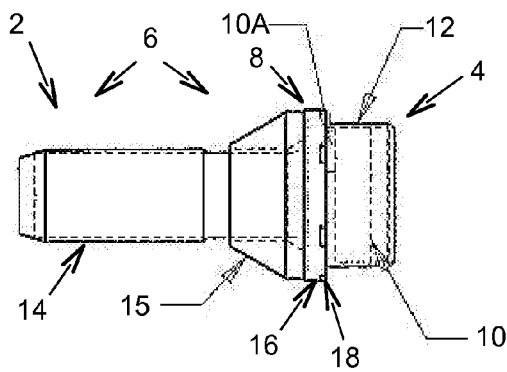
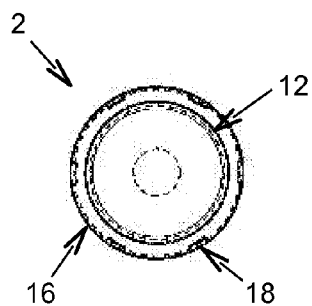
FIG. 1          FIG. 2
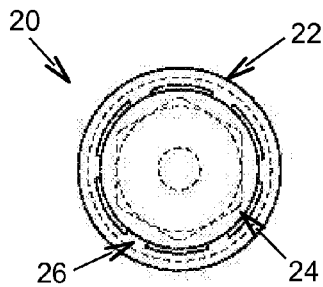
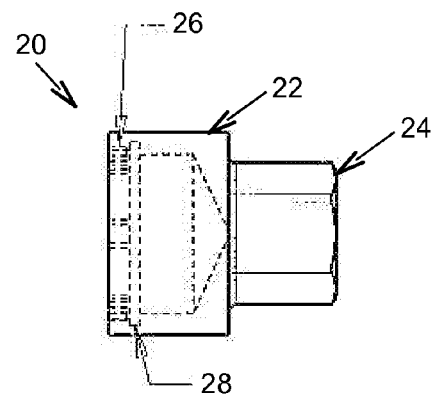
FIG. 3          FIG. 4
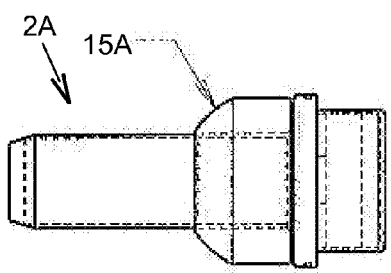
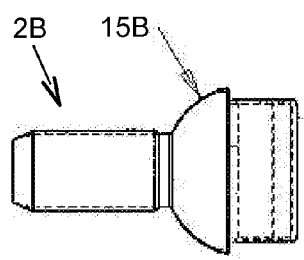
FIG. 5A         FIG. 5B
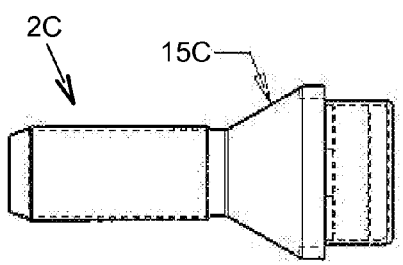
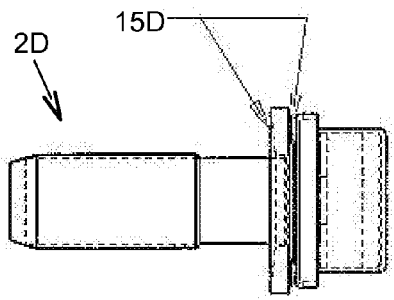
FIG. 5C         FIG. 5D

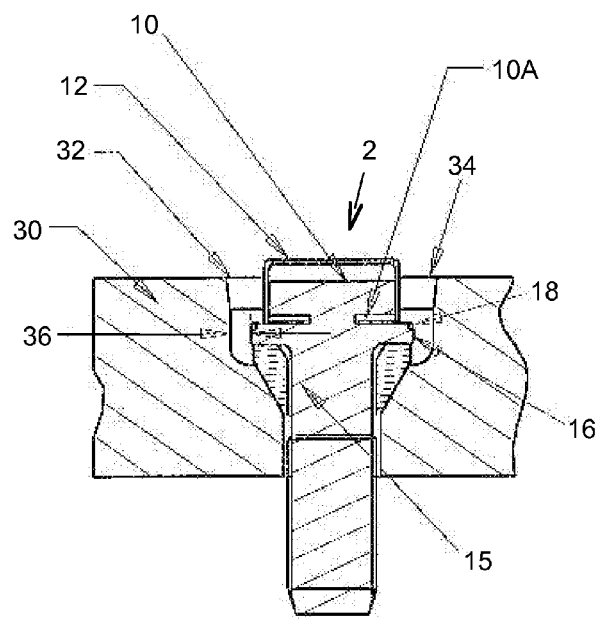
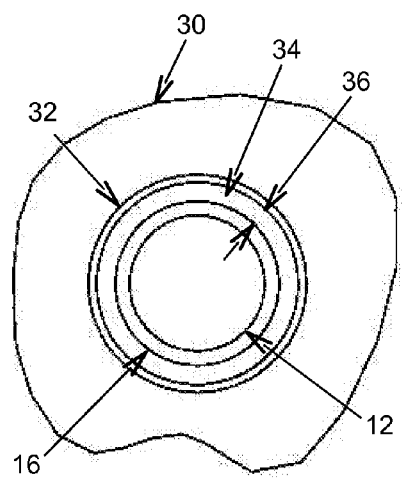
FIG. 6  FIG. 7
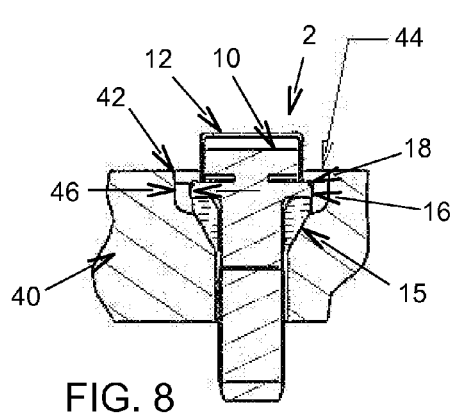
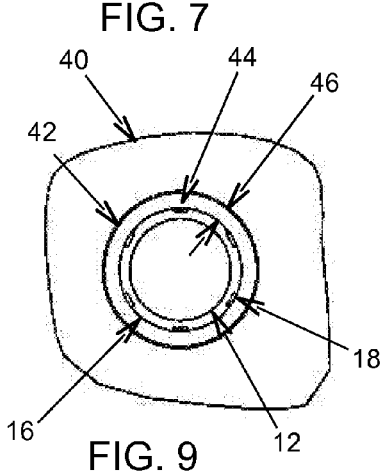
FIG. 8  FIG. 9
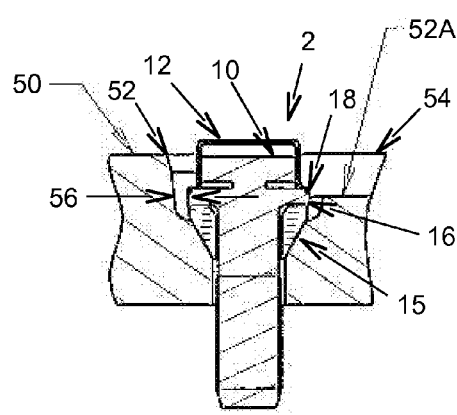
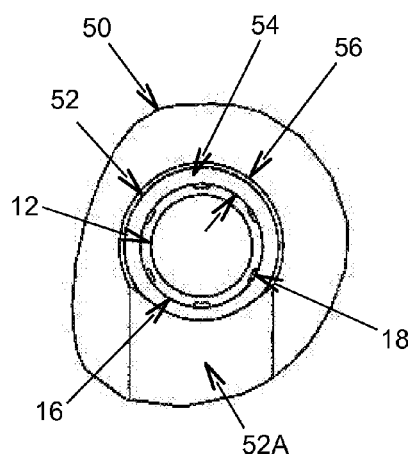
FIG. 10  FIG. 11

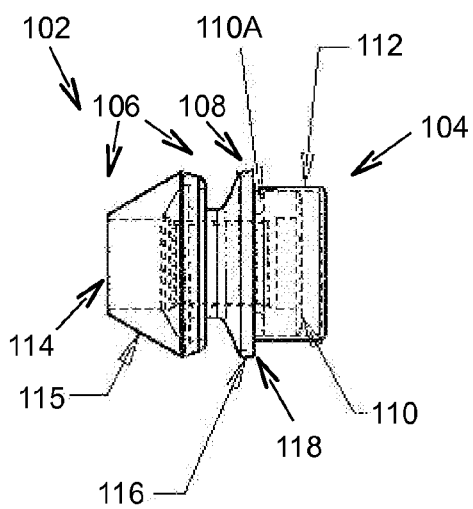
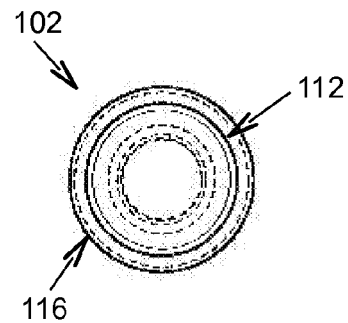
FIG. 12
FIG. 13
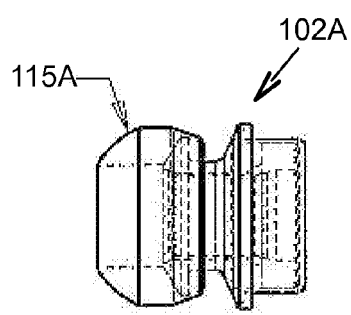
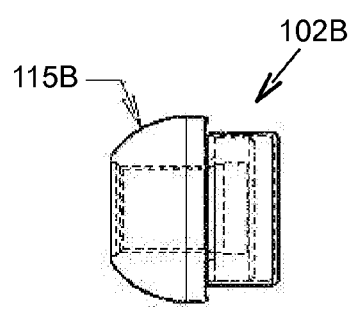
FIG. 14A
FIG. 14B
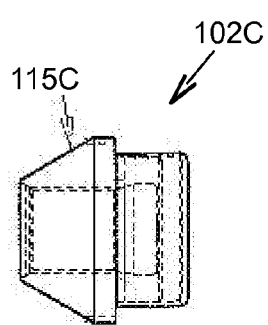
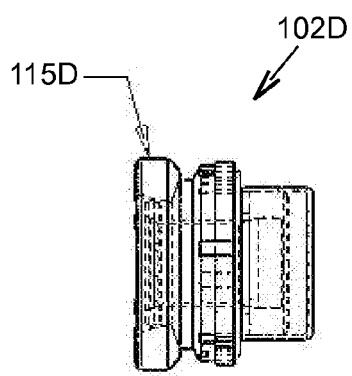
FIG. 14C
FIG. 14D

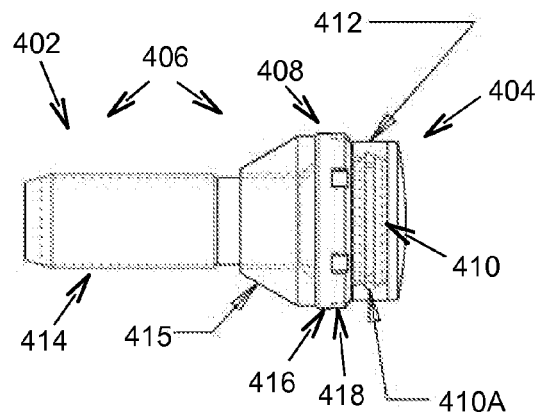
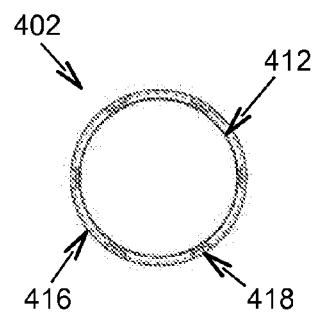
FIG. 23  FIG. 24
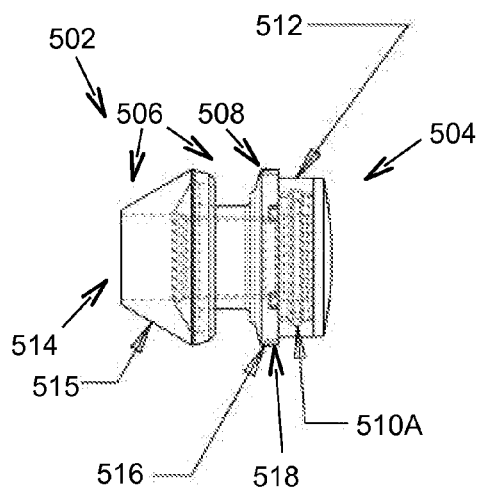
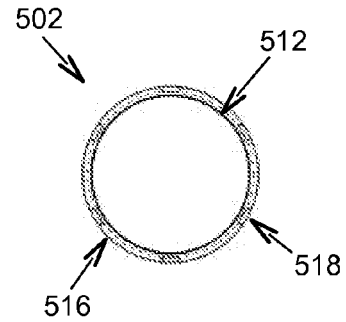
FIG. 25  FIG. 26

SECURITY FASTENER FOR WHEELS WITH A RECESS HOLE

CROSS-REFERENCE TO RELATED APPLICATIONS

This application claims the benefit of U.S. Provisional Patent Application No. 61/255,616, filed on Oct. 28, 2009, entitled "Security Fastener For Wheels With A Recess Hole." This application further claims the benefit of U.S. Provisional Patent Application No. 61/373,895, filed on Aug. 16, 2010, entitled "Security Fastener For Wheels With A Recess Hole." The entire contents of both of the above-identified provisional applications are hereby incorporated herein by this reference.

BACKGROUND

1. Field

The present disclosure relates to vehicle wheel fasteners, including lug bolts and lug nuts. More particularly, the disclosure concerns security fasteners for installation on vehicle wheels having a recess hole (including but not limited to metal alloy vehicle wheels).

2. Description of Prior Art

By way of background, standard bolts and nuts have no security feature because they are designed to be fastened and unfastened using standard tools, such as wrenches, which can be easily obtained. For some fastener applications, such as the attachment of valuable assets, security fasteners have been developed to prevent unauthorized fastener removal and theft. One example is security locks for metal alloy vehicle wheels. Metal alloy wheels are typically formed with recess holes in which the security locks are wholly or partially recessed following installation. The recess may be relatively narrow and deep (as commonly found in tuner rims) or somewhat wider and shallower. In some cases the recess sidewall is of varying height such that the recess only partially recesses the security lock. Security locks designed for installation in recess holes include both lock bolts and lock nuts. Such locks are typically formed with a security groove pattern that is exposed outside, at or inside an entrance to the recess hole. A special key having a matching security ridge pattern is required to install and remove the locks. Although such locks are generally satisfactory, applicants submit that further improvements are possible to increase the level of security provided by lock bolts, lock nuts and other security fasteners designed for wheels having a recess hole.

SUMMARY

In one aspect of the present disclosure, a security fastener for installation on a wheel having a recess hole includes a first end portion and a second medial portion. The first end portion is arranged so that it will be exposed outside, at or inside an entrance to the recess hole when the fastener is installed on the wheel. The first end portion comprises a security feature that prevents the fastener from being removed from the recess hole should an attempt be made to rotate the fastener by gripping the first end portion. The security feature may comprise a security structure selected from the group consisting of (1) a breakaway post on the first end portion, (2) a rotatable cap on the first end portion, and (3) a combination of a breakaway post on the first end portion and a rotatable cap on the breakaway post. The second medial portion has an external key-receiving lock pattern. The second medial portion is arranged so that a side wall region thereof will extend within the recess hole when the fastener is installed therein, and so that the lock pattern will be exposed outside, at or inside the entrance to the recess hole. A second end portion includes a thread pattern and is arranged so that it will be disposed deeper in the recess hole than the medial portion when the fastener is installed in the recess hole.

In another aspect of the present disclosure, a security fastener for installation on a wheel having a recess hole includes a first end portion and a second portion. The first end portion includes a cap and comprises a breakaway post member on which the cap is mounted and which is configured to break away from a remainder of the fastener if an attempt is made to rotate the fastener by gripping the cap with an unauthorized tool. The cap is arranged so that it will be exposed outside, at or inside an entrance to the recess hole when the fastener is installed in the recess hole. The second portion is not covered by the cap and has an external key-receiving lock pattern. The second portion is arranged so that a side wall region thereof will extend within the recess hole when the fastener is installed in the recess hole and so that the lock pattern will be exposed outside, at or inside the entrance to the recess hole.

In another aspect of the present disclosure, a security fastener for installation on a wheel having a recess hole includes a first end portion and a second portion. The first end portion is covered by a spin cap that is arranged so that it will be exposed outside, at or inside an entrance to the recess hole when the fastener is installed in the recess hole. The spin cap is designed to spin if an attempt is made to rotate the fastener by gripping the spin cap with an unauthorized tool, thereby preventing unauthorized removal of the fastener at the first end portion. The second portion is not covered by the spin cap and has an external key-receiving lock pattern. The second portion is arranged so that a side wall region thereof will extend within the recess hole when the fastener is installed in the recess hole and so that the lock pattern will be exposed outside, at or inside the entrance to the recess hole. A third portion of the fastener includes a thread pattern and is arranged so that it will be disposed deeper in the recess hole than the fastener second portion when the fastener is installed in the recess hole.

In another aspect of the present disclosure, a fastener includes a fastener body having a first end portion, a second end portion and an intermediate portion between the first and second end portions. A breakaway post is provided on the first end portion. A lock pattern is provided on the intermediate portion. A thread pattern is provided on the second end portion.

In another aspect of the present disclosure, a fastener includes a fastener body having a first end portion, a second end portion and an intermediate portion between the first and second end portions. A spinnable protective member is provided on the first end portion. A lock pattern is provided on the intermediate portion. A thread pattern is provided on the second end portion.

In another aspect of the present disclosure, a fastener includes a breakaway post.

In another aspect of the present disclosure, a fastener includes a substantially non-removable close-ended spin cap.

BRIEF DESCRIPTION OF THE DRAWINGS

The foregoing and other features and advantages will be apparent from the following more particular description of example embodiments, as illustrated in the accompanying Drawings, in which:

FIG. 1 is a side view showing a security fastener according to a first example embodiment;

FIG. 2 is an end view showing the security fastener of FIG. 1;

FIG. 3 is an end view showing a security key that may be used with the security fastener of FIG. 1;

FIG. 4 is a side view of the security key of FIG. 3;

FIG. 5A is a side view showing a modification of the security fastener of FIG. 1;

FIG. 5B is a side view showing another modification of the security fastener of FIG. 1;

FIG. 5C is a side view showing another modification of the security fastener of FIG. 1;

FIG. 5D is a side view showing another modification of the security fastener of FIG. 1;

FIG. 6 is a cross-sectional view showing an example installation of the security fastener of FIG. 1;

FIG. 7 is a plan view showing the example installation of FIG. 6;

FIG. 8 is a cross-sectional view showing another example installation of the security fastener of FIG. 1;

FIG. 9 is a plan view showing the example installation of FIG. 8;

FIG. 10 is a cross-sectional view showing another example installation of the security fastener of FIG. 1;

FIG. 11 is a plan view showing the example installation of FIG. 10;

FIG. 12 is a side view showing a security fastener according to a second example embodiment;

FIG. 13 is an end view showing the security fastener of FIG. 12;

FIG. 14A is a side view showing a modification of the security fastener of FIG. 12;

FIG. 14B is a side view showing another modification of the security fastener of FIG. 12;

FIG. 14C is a side view showing another modification of the security fastener of FIG. 12;

FIG. 14D is a side view showing another modification of the security fastener of FIG. 12;

FIG. 23 is a side view showing a security fastener according to a fifth example embodiment;

FIG. 24 is an end view showing the security fastener of FIG. 23;

FIG. 25 is a side view showing a security fastener according to a sixth example embodiment;

FIG. 26 is an end view showing the security fastener of FIG. 25;

DETAILED DESCRIPTION OF EXAMPLE EMBODIMENTS

Introduction

Figure 15:
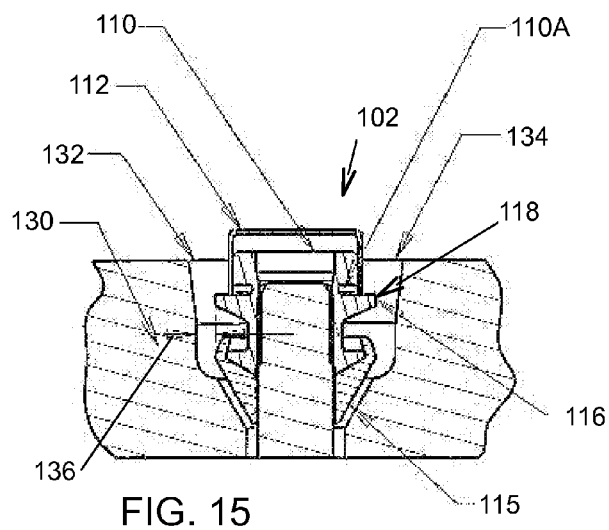
FIG. 15 is a cross-sectional view showing an example installation of the security fastener of FIG. 12.
Figure 16:
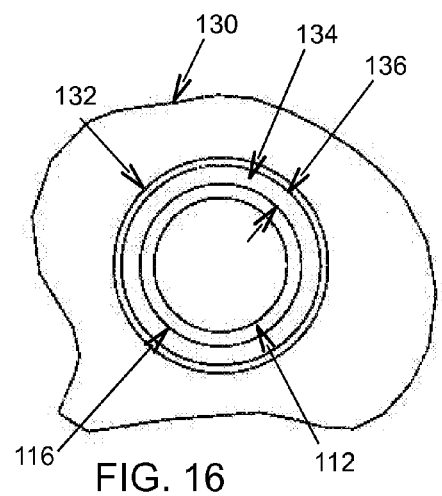
FIG. 16 is a plan view showing the example installation of FIG. 15.

In this description, various example security fastener embodiments are disclosed. The disclosed security fasteners are suited for installation in wheels or other structures wherein the fasteners are received in a recess hole. As described in more detail below, such recess holes may have a variety of configurations. Advantageously, the disclosed security fasteners are optimized to use the recess hole as a security enhancer to prevent fastener removal using unauthorized tools. In particular, the security fasteners are designed so that they can only be removed using an authorized key to engage a fastener key-receiving portion that is at least partially protected by the recess hole that forms part of each fastener installation. Any attempt to rotate the fastener by gripping other exposed locations on the fastener will not succeed. Example fastener types include threaded bolts and nuts. Unless otherwise indicated, all components described herein may be formed from a suitable metal, including but not limited to steel, stainless steel, brass, aluminum, titanium, as well as other metals and alloys. Non-metallic materials could potentially also be used for some applications.

First Example Embodiment

Turning now to FIGS. 1 and 2, a bolt-type security fastener 2 according to a first example embodiment is shown. The bolt fastener 2 includes a first end portion 4, a second end portion 6 and a medial (intermediate) portion 8 disposed between the first and second end portions. The first end portion 4 of the bolt fastener 2 comprises a generally cylindrical lock post 10. In the present embodiment, the lock post 10 is formed as an integral part of the fastener body. However, as described in more detail below in connection with the fourth example embodiment shown in FIG. 22, the lock post 10 could be a separately mounted component. The lock post 10 is formed with an undercut groove 10A at the base thereof whose diameter is less than the main diameter of the post. As described in more detail below, the groove 10A provides an area of weakness that allows the lock post 10 to serve as a security structure, namely, by acting as a breakaway post that will break off at the groove 10A if fastener removal is attempted by gripping the first end portion 4 using an unauthorized tool. The first end portion 4 may also optionally comprise a close-ended cap 12 that mounts on the lock post 10. The cap 12 has a cylindrical bore whose inside diameter is approximately the same size as the lock post's outside diameter. The cap 12 can thus be secured by press-fitting it onto the lock post 10. This will retain the cap 12 on the lock post 10, rendering it substantially non-removable for the most part, but will tend to allow the cap to rotate (spin) in the event that the bolt fastener's first end portion 4 is gripped for rotation by an unauthorized tool. Other mounting techniques could also be used, including those that do not allow the cap 12 to spin. However, as described in more detail below, the ability of the cap 12 to spin on the lock post 10 (with or without a tool) provides an additional level of security for the bolt fastener 2. Although the exterior of the cap 12 is shown as being substantially cylindrical, other shapes could also be used, such as hexagonal, square, rounded, etc. Moreover, although the cap 12 is shown as being closed ended, it could also have an open-ended configuration that wholly or partially exposes the end of the lock post 10. If desired, the cap 12 may have a decorative finish to improve fastener appearance, including but not limited to nickel/chrome plating, silver or gray coatings, etc.

The second end portion 6 of the bolt fastener 2 includes a shank 14 that is externally threaded over a portion (or all) of its length. The second end portion 6 further includes an external seat that may be provided by a floating cone shaped seat washer 15 mounted on the shank 14. Alternative seat configurations may also be used, as will be described in more detail below in connection with FIGS. 5A-5D.

The medial portion 8 of the bolt fastener 2 has a sidewall 16 that is substantially cylindrical in shape. The sidewall 16 is formed (such as by machining, cold forming, etc.) with a key-receiving pattern that may be implemented as a set of circumferentially arranged key-receiving lock pattern grooves 18. Lock pattern configurations that use formations of other than grooves could potentially also be used. In FIGS. 1 and 2, each lock pattern groove 18 is formed as a generally rectangular, longitudinally extending channel that intersects the front edge of the sidewall 16 of the bolt fastener's medial portion 8. Thus, as can be seen in FIG. 2, the lock pattern grooves 18 are visible on the medial portion's annular front face that lies between the sidewall 16 and the cap 12. As can be seen in FIG. 1, each lock pattern groove 18 extends rearwardly a short distance from the front edge of the sidewall 16. If desired, the groove length could be increased, and indeed, could span the entire length of the sidewall 16 if desired. In order to impart lock pattern uniqueness, the lock pattern grooves 18 may be patterned in any suitable manner, such as by employing a selected number of grooves and/or by varying other features thereof, such as the spacing between grooves and/or the width, length, depth, or other configuration feature thereof.

FIGS. 3 and 4 illustrate an example key 20 that may be used to engage the lock pattern grooves 18. The key 20 includes a socket 22 and a drive portion 24. The entrance to the socket 22 is formed with a key pattern that may be implemented as a set of circumferentially arranged key pattern lobes 26. The key pattern lobes 26 are configured and arranged to engage the lock pattern grooves 18 when the socket 22 is placed over the bolt fastener's first end portion 4. Behind the key pattern lobes 26, the socket 22 is substantially cylindrical and sized to accommodate the bolt fastener's first end 4. If desired, an optional annular groove 28 may be formed directly behind the key pattern lobes 26 to assist machining operations during key fabrication. The drive portion 24 of the key 20 may be formed with a conventional hex (or other) configuration for engagement by a standard wrench or drive tool.

FIGS. 5A-5D illustrate example design modifications of the bolt fastener 2 in which the modified fasteners have different seat configurations. The modified fasteners are identical in all other respects. Thus, rather than duplicate each reference number in FIGS. 5A-5D, only the salient fastener modifications are referenced. FIG. 5A shows a modified bolt fastener 2A in which the fastener's second end portion 6 mounts a floating radius seat 15A. FIG. 5B shows a modified bolt fastener 2B in which the fastener's second end portion 6 is integrally formed with a solid radius seat 15B whose front region transitions to provide the fastener's medial portion. FIG. 5C shows a modified bolt fastener 2C in which the fastener's second end portion 6 is integrally formed with a solid cone seat 15C whose front region transitions to provide the fastener's medial portion. FIG. 5D shows a modified bolt fastener 2D in which the fastener's second end portion 6 mounts a flat seat washer 15D having an optional taper on the washer face.

Turning now to FIGS. 6-11, several example installations are shown in which the bolt fastener 2 is mounted on wheels that have at least one fastener-receiving recess hole. Examples of such wheels include, but are not limited to, metal alloy vehicle wheels that are cast or forged from a lightweight metal, such as alloys of aluminum, magnesium or titanium. Each example installation has a different type of recess hole in order to illustrate the variety of installation environments in which the bolt fastener 2 may be used.

In FIGS. 6 and 7, the bolt fastener 2 is installed in a wheel 30 having a recess hole 32 formed as a relatively deep cylindrical well. In this installation, the bolt fastener's first end portion 4 is arranged so that it will be exposed either slightly outside, at or slightly inside the entrance 34 to the recess hole 32 when the bolt fastener 2 is installed therein. As previously stated, the breakaway configuration of the lock post 10, coupled with the ability of the cap 12 to spin, provides a security feature that protects the first end portion 4 from being used as a purchase point for unauthorized tools. Should an attempt be made to rotate the bolt fastener 2 by gripping the first end portion 4, its breakaway post construction will tend to produce a break at the lock post groove 10A. In addition, prior to the first end portion 4 breaking off, the cap 12 will tend to spin without any rotation being imparted to the fastener itself.

The bolt fastener's medial portion 8 is arranged so that the sidewall 16 thereof extends within the recess hole 32. In this position, the bolt fastener's lock pattern (situated on the upper side of the sidewall 16) is only exposed inside the recess hole entrance 34. In fact, the fastener's sidewall 16 and lock pattern grooves 18 are situated fairly deeply within the recess hole 32 at a location that is significantly recessed from the recess hole entrance 34. In this position, access to the bolt fastener's lock pattern is limited by the circumferential gap space 36 between the lock pattern's outside diameter and the recess hole's inside diameter. Advantageously, the security key 20 is configured to fit within the gap space 36 to engage the lock pattern and rotate the bolt fastener 2. Other tools either will not fit within the gap space 36 or will not be able to properly engage and rotate the bolt fastener 2 when it is installed at its intended design installation torque. Note that the size of the gap space 36 can be controlled by sizing the diameter of the bolt fastener's medial portion 8 according to the diameter of the recess hole 32. In this way, the medial portion 8 can be configured to provide a fastener security feature. Applicants' have determined that a gap space size that is not in excess of approximately 3 mm will block standard sockets and thereby provide maximum protection for the bolt fastener 2 against unauthorized removal.

In FIGS. 8 and 9, the bolt fastener 2 is installed in a wheel 40 having a recess hole 42 formed as a relatively shallow cylindrical well. In this installation, the bolt fastener's first end portion 4 is arranged so that it will be exposed substantially outside the entrance 44 to the recess hole 42 when the bolt fastener 2 is installed therein. However, this region of the bolt fastener 2 is not vulnerable to gripping by an unauthorized tool due to the breakaway construction of the lock post 10 coupled with the ability of the cap 12 to spin. Moreover, the bolt fastener's sidewall 16 will extend into the recess hole 42 and the bolt fastener's lock pattern (situated on the upper side of the sidewall 16) will be mainly exposed only inside or at the recess hole entrance 44. Even if the uppermost portion of the lock pattern grooves 18 should extend slightly outside the recess hole entrance, access to the remainder of the bolt fastener's lock pattern is limited by the circumferential gap space 46 between the lock pattern's outside diameter and the recess hole's inside diameter. As explained above, limiting the size of the gap space 46 ensures that unauthorized tools may not be used to remove the bolt fastener 2 when it is installed at its intended design installation torque. The only way to properly engage and rotate the bolt fastener 2 is by using an authorized key, such as the security key 20.

In FIGS. 10 and 11, the bolt fastener 2 is installed in a wheel 50 having a recess hole 52 formed as a cylindrical well that intersects a channel 52A. Thus, the recess hole 52 will be seen as having a high side on its cylindrical portion and a low side where the channel 52A is situated. On the high side of the recess hole 52, the bolt fastener's first end portion 4 is exposed either slightly outside, at or slightly inside the entrance 54 to the recess hole 52 when the bolt fastener 2 is installed therein. On the low side of the recess hole 52, the bolt fastener's first end portion 4 is arranged so that the channel side thereof is exposed. However, this region of the bolt fastener 2 is not vulnerable to gripping by an unauthorized tool due to the breakaway construction of the lock post 10 coupled with the ability of the cap 12 to spin. With respect to the bolt fastener's sidewall 16, it too will extend into the high side of the recess hole 52 and the bolt fastener's lock pattern comprising the grooves 18 (situated on the upper side of the sidewall 16) will be mainly exposed inside or at the high side of the recess hole entrance 54. Even though the low side of the fastener's lock pattern is exposed on the low side of the recess hole 52, the majority of the lock pattern is protected by the circumferential gap space 56 between the lock pattern's outside diameter and the recess hole's inside diameter. As explained above, limiting the size of the gap space 56 ensures that unauthorized tools may not be used to remove the bolt fastener 2 when it is installed at its intended design installation torque. The only way to properly engage and rotate the bolt fastener 2 is by using an authorized key, such as the security key 20.

Second Example Embodiment

Turning now to FIGS. 12 and 13, a nut-type security fastener 102 according to a second example embodiment is shown. Apart from the fact that the nut fastener 102 is a nut whereas the above-described bolt fastener 2 is a bolt, the two fasteners are identical as far as their security features are concerned. The nut fastener 102 thus includes a first end portion 104, a second end portion 106 and a medial (intermediate) portion 108 disposed between the first and second end portions. The first end portion 104 of the nut fastener 102 comprises a generally cylindrical lock post 110 that may be integrally formed (or separately mounted) on the fastener body. The lock post 110 has an undercut groove 110A at the base thereof whose diameter is less than the main diameter of the post. As in the case of the previously-described bolt fastener 2, the groove 110A provides an area of weakness that allows the lock post 110 to serve as a security structure, namely, by acting as a breakaway post that will break off at the groove if fastener removal is attempted by gripping the first end portion 104 using an unauthorized tool. The first end portion 104 may also optionally comprise a close-ended cap 112 that mounts on the lock post 110. The cap 112 has a cylindrical bore whose inside diameter is approximately the same size as the lock post's outside diameter. The cap 112 can thus be secured by press-fitting it onto the lock post 110. This will retain the cap 112 on the lock post 110 while allowing it to rotate (spin) in the event that the first end portion 104 is gripped for rotation by an unauthorized tool. Other mounting techniques could also be used, including those that do not allow the cap 112 to spin. As in the case of the previously-described bolt fastener 2, the ability of the cap 112 to spin on the lock post 110 (with or without a tool) provides an additional level of security for the nut fastener 102. Although the exterior of the cap 112 is shown as being substantially cylindrical, other shapes could also be used, such as hexagonal, square, rounded, etc. Moreover, although the cap 112 is shown as being closed ended, it could also have an open-ended configuration that wholly or partially exposes the end of the lock post 110. If desired, the cap 112 may have a decorative finish to improve fastener appearance, including but not limited to nickel/chrome plating, silver or grey coatings, etc.

The second end portion 106 of the nut fastener 102 includes a bore 114 that is internally threaded over a portion (or all) of its length. As shown in FIG. 12, the bore 114 may extend through the entire length of the nut fastener 102, including the lock post 110. This construction can simplify manufacturing and reduce fastener weight. If desired, however, the bore 114 could extend only partially through the nut fastener 102. The second end portion 106 further includes an external seat that may be provided by a floating cone shaped seat washer 115 mounted on the shank 114. Alternative seat configurations may also be used, as will be described in more detail below in connection with FIGS. 14A-14D.

The medial portion 108 of the nut fastener 102 has a sidewall 116 that is substantially cylindrical in shape. The sidewall 116 is formed with a key-receiving pattern that may be implemented as a set of circumferentially arranged lock pattern grooves 118 in the same manner as the lock pattern grooves 18 of the bolt fastener 2 described above. For example, each lock pattern groove 118 may be formed as a generally rectangular, longitudinally extending channel that intersects the front edge of the sidewall 116 of the nut fastener's medial portion 108. The lock pattern grooves 118 may either extend partially along the length of the sidewall 116 or entirely therethrough, as is shown in FIG. 12. A key having a matching set of key pattern lobes (such as the key 20 of FIGS. 3 and 4) may be used to engage the lock pattern groove 118 to actuate the nut fastener 104.

FIGS. 14A-14D illustrate example design modifications of the nut fastener 102 in which the modified fasteners have different seat configurations. The modified fasteners are identical in all other respects. Thus, rather than duplicate each reference number in FIGS. 14A-14D, only the salient fastener modifications are referenced. FIG. 14A shows a modified nut fastener 102A in which the fastener's second end portion 106 mounts a floating radius seat 115A. FIG. 14B shows a modified nut fastener 102B in which the fastener's second end portion 106 is integrally formed with a solid radius seat 115B whose front region transitions to provide the fastener's medial portion. FIG. 14C shows a modified nut fastener 102C in which the fastener's second end portion 106 is integrally formed with a solid cone seat 115C whose front region transitions to provide the fastener's medial portion. FIG. 14D shows a modified nut fastener 102D in which the fastener's second end portion 106 mounts a flat seat washer 115D having an optional taper on the washer face.

Turning now to FIGS. 15-20, several example installations are shown in which the nut fastener 102 is mounted on a wheel having a recess hole. These installations are substantially identical to the installations described above in connection with FIGS. 6-11. Thus, in FIGS. 15 and 16, the nut fastener 102 is installed in a wheel 130 having a recess hole 132 formed as a relatively deep cylindrical well. In this installation, the nut fastener's first end portion 104 is arranged so that it will be exposed either slightly outside, at or slightly inside the entrance 134 to the recess hole 132 when the nut fastener 102 is installed therein. As in the case of the previously-described bolt fastener 2, the breakaway configuration of the lock post 110, coupled with the ability of the cap 112 to spin, provides a security feature that protects the first end portion 104 from being used as a purchase point for unauthorized tools. Should an attempt be made to rotate the nut fastener 102 by gripping the first end portion 104, its breakaway post construction will tend to produce a break at the lock post groove 110A. Prior to the first end portion 104 breaking off, the cap 112 will tend to spin without any rotation being imparted to the fastener itself.

The nut fastener's medial portion 108 is arranged so that the sidewall 116 thereof extends within the recess hole 132. In this position, the nut fastener's lock pattern (situated on the upper side of the sidewall 116) is only exposed inside the recess hole entrance 134. In fact, the fastener's sidewall 116 and lock pattern grooves 118 are situated fairly deeply within the recess hole 132 at a location that is significantly recessed from the recess hole entrance 134. In this position, access to the nut fastener's lock pattern is limited by the circumferential gap space 136 between the lock pattern's outside diameter and the recess hole's inside diameter. Advantageously, the security key 20 is configured to fit within the gap space 136 to engage the lock pattern and rotate the nut fastener 102. Other tools either will not fit within the gap space 136 or will not be able to properly engage and rotate the nut fastener 102 when it is installed at its intended design installation torque. Note that the size of the gap space 136 can be controlled by sizing the diameter of the nut fastener's medial portion 108 according to the diameter of the recess hole 132. In this way, the medial portion 108 can be configured to provide a fastener security feature. As stated above in connection with the bolt fastener 2, applicants' have determined that a gap space size that is not in excess of approximately 3 mm will block standard sockets and thereby provide maximum protection for the nut fastener 102 against unauthorized removal.

Figure 17:
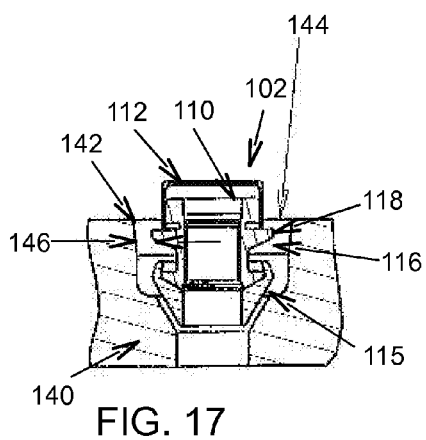
FIG. 17 is a cross-sectional view showing another example installation of the security fastener of FIG. 12.
Figure 18:
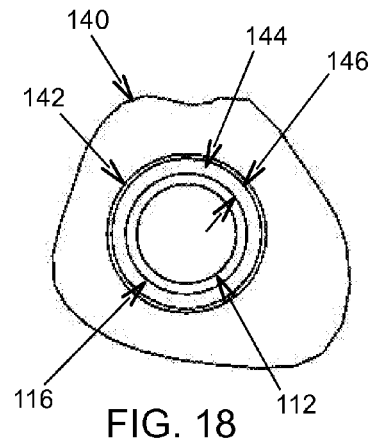
FIG. 18 is a plan view showing the example installation of FIG. 17.

In FIGS. 17 and 18, the nut fastener 102 is installed in a wheel 140 having a recess hole 142 formed as a relatively shallow cylindrical well. In this installation, the nut fastener's first end portion 104 is arranged so that it will be exposed substantially outside the entrance 144 to the recess hole 142 when the nut fastener 102 is installed therein. However, this region of the nut fastener 102 is not vulnerable to gripping by an unauthorized tool due to the breakaway construction of the post 110, coupled with the ability of the cap 112 to spin. Moreover, the nut fastener's sidewall 116 will extend into the recess hole 142 and the nut fastener's lock pattern (situated on the upper side of the sidewall 116) will be mainly exposed only inside or at the recess hole entrance 144. Even if the uppermost portion of the lock pattern grooves 118 should extend slightly outside the recess hole entrance, access to the remainder of the nut fastener's lock pattern is limited by the circumferential gap space 146 between the lock pattern's outside diameter and the recess hole's inside diameter. As explained above, limiting the size of the gap space 146 ensures that unauthorized tools may not be used to remove the nut fastener 102 when it is installed at its intended design installation torque. The only way to properly engage and rotate the nut fastener 102 is by using an authorized key, such as the security key 20.

Figure 19:
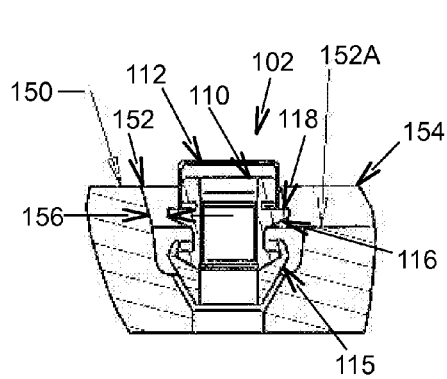
FIG. 19 is a cross-sectional view showing another example installation of the security fastener of FIG. 12.
Figure 20:
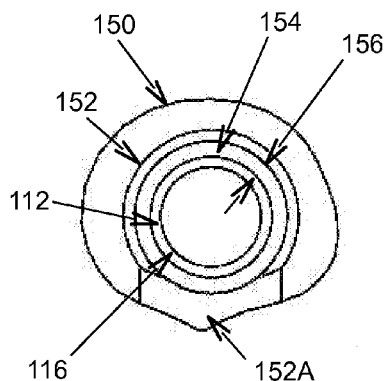
FIG. 20 is a plan view showing the example installation of FIG. 19.

In FIGS. 19 and 20, the nut fastener 102 is installed in a wheel 150 having a recess hole 152 formed as a cylindrical well that intersects a channel 152A. Thus, the recess hole 152 will be seen as having a high side on its cylindrical portion and a low side where the channel 152A is situated. On the high side of the recess hole 152, the nut fastener's first end portion 104 is exposed either slightly outside, at or slightly inside the entrance 154 to the recess hole 152 when the nut fastener 102 is installed therein. On the low side of the recess hole 152, the nut fastener's first end portion 104 is arranged so that the channel side thereof is exposed. However, this region of the nut fastener 102 is not vulnerable to gripping by an unauthorized tool due to the breakaway construction of the lock post 110, coupled with the ability of the cap 112 to spin. With respect to the nut fastener's sidewall 116, it too will extend into the high side of the recess hole 152 and the nut fastener's lock pattern comprising the grooves 118 (situated on the upper side of the sidewall 116) will be mainly exposed inside or at the high side of the recess hole entrance 154. Even though the low side of the fastener's lock pattern is exposed on the low side of the recess hole 152, the majority of the lock pattern is protected by the circumferential gap space 156 between the lock pattern's outside diameter and the recess hole's inside diameter. As explained above, limiting the size of the gap space 156 ensures that unauthorized tools may not be used to remove the nut fastener 102 when it is installed at its intended design installation torque. The only way to properly engage and rotate the nut fastener 102 is by using an authorized key, such as the security key 120.

Third Example Embodiment

Figure 21:
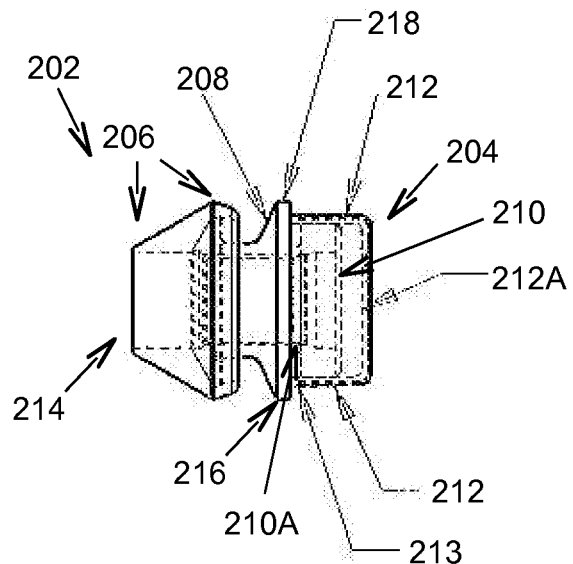
FIG. 21 is a side view showing a security fastener according to a third example embodiment.

Turning now to FIG. 21, a nut-type security fastener 202 according to a third example embodiment is shown. The nut fastener 202 is similar in most respects to the nut fastener 102 described above. This similarity is indicated by the use of corresponding reference numbers for the various fastener features, with each corresponding reference number being incremented by 100. The difference between the nut fastener 202 and the nut fastener 102 lies in the fact that the fastener of the current embodiment is designed to prevent bimetallic corrosion between the cap 212 and the post 210, and between the cap 212 and the fastener's medial portion 208. Such corrosion could potentially result if the cap 212 was constructed with a first metal and the post 210 and the medial portion 208 were constructed with a second metal. In the nut fastener 202, bimetallic corrosion between the cap 212 and the post 210 may be eliminated by first placing a non-metallic (e.g., plastic) intermediate or inner cap 212A on the post, and then using the metallic cap 212 as an outer cap that mounts over the intermediate cap. The intermediate cap 212A will maintain separation between the outer cap 212 and the post 210, thereby preventing bimetallic corrosion between these components. To prevent bimetallic corrosion between the outer cap 212 and the fastener's medial portion 208, a small gap 213 may be provided to maintain separation between these components. It will be appreciated that the nut fastener 202 may be used in any of the installations shown in FIGS. 15-20 (described above in connection with the nut fastener 102), and will provide the same security features. Only an authorized key, such as the security key 20, may be used to effect fastener removal. In addition, the corrosion-preventing design features of the nut fastener 202 could also be incorporated in a bolt fastener (not shown). Such as bolt fastener could then be used in any of the installations shown in FIGS. 6-11 (described above in connection with the bolt fastener 2).

Fourth Example Embodiment

Figure 22:
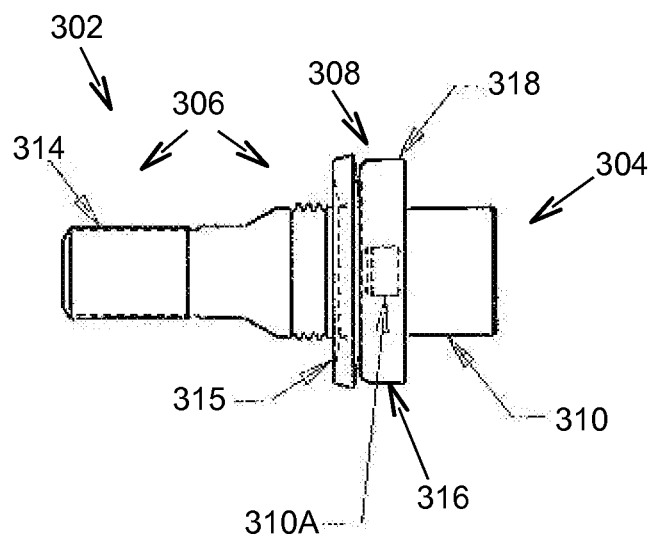
FIG. 22 is a side view showing a security fastener according to a fourth example embodiment.

Turning now to FIG. 22, a bolt-type security fastener 302 according to a fourth example embodiment is shown. The bolt fastener 302 has many of the features of the bolt fastener 2 described above in connection with FIGS. 1 and 2. This similarity is indicated by the use of corresponding reference numbers for the various fastener features, with each corresponding reference number being incremented by 300. The major difference between the bolt fastener 302 and the bolt fastener 2 lies in the fact that fastener of the current embodiment has a different type of lock post 310. As previously stated, the lock post 10 of the bolt fastener 2 comprises an integral part of the fastener body, and is formed with a groove 10A to provide an area of weakness that allows the lock post 10 to serve as a security structure. In the bolt fastener 302, the lock post 310 is a separate component designed with a reduced-diameter stem or pin 310A. The stem 310A is press-fitted into a central bore in the fastener's medial portion 308. The reduced diameter of the stem 310A limits the amount of material used for the mounting connection and provides an area of weakness that allows the lock post 310 to serve as a security structure. In particular, the lock post 310 acts as a breakaway post that will break off at the stem 310A if fastener removal is attempted by gripping the first end portion 304 using an unauthorized tool. Another distinguishing feature of the bolt fastener 302 is that it does not have a cap on the lock post 310. This capless option is illustrated by way of example only and not by way of limitation. Such as cap could be added if desired. A further distinguishing feature of the bolt fastener 302 is that it is optionally provided with a flat seat washer 315 similar to the seat washer 15D of the bolt fastener 2D shown in FIG. 5D. Other seat types, including any of the seats shown in FIGS. 1 and 5A-5C, could also be used with the bolt fastener 302. It will be appreciated that the bolt fastener 302 may be used in any of the installations shown in FIGS. 6-11 (described above in connection with the bolt fastener 2), and will provide similar security features (albeit without the benefit of a rotatable cap). Only an authorized key, such as the security key 20, may be used to effect fastener removal. In addition, the stem-connected lock post design features of the bolt fastener 302 could also be incorporated in a nut fastener (not shown). Such as nut fastener could then be used in any of the installations shown in FIGS. 15-20 (described above in connection with the nut fastener 102).

Fifth Example Embodiment

Turning now to FIGS. 23 and 24, a bolt-type security fastener 402 according to a fifth example embodiment is shown. The bolt fastener 402 has many of the features of the bolt fastener 2 described above in connection with FIGS. 1 and 2. This similarity is indicated by the use of corresponding reference numbers for the various fastener features, with each corresponding reference number being incremented by 400. The major difference between the bolt fastener 402 and the bolt fastener 2 lies in the fact that the cap 412 is not press-fitted onto the post. Another distinguishing feature is that the bolt fastener's lock post 410 may be optionally formed with or without a breakaway construction. For purposes of example only, FIG. 23 illustrates the former option wherein the lock post 410 is not designed to breakaway. In the bolt fastener 402, the cap 412 is a close-ended (or open-ended) free-spinning cap (spin cap). The spin cap 412 may have any desired exterior configuration and finish. The inside of the spin cap 412 comprises a cylindrical bore whose inside diameter is slightly larger than the outside diameter of the post 410. The spin cap 412 is secured for spinning on the post 410 using a suitable retainer, such as a split ring 410A, rendering it substantially non-removable for the most part. The spin cap 412 thus represents a security structure of the fastener 402. If removal of the bolt fastener 402 is attempted by gripping the first end portion 404 using an unauthorized tool, the spin cap 412 will simply spin without rotating the fastener. It will be appreciated that the bolt fastener 402 may be used in any of the installations shown in FIGS. 6-11 (described above in connection with the bolt fastener 2), and will similar security features, the only difference being that the lock post 410 may or may not be configured to separate from the remainder of the fastener. Moreover, the spin cap 412 will freely spin on the lock post 410 if an attempt is made to remove the bolt fastener 402 by gripping the first end portion 404 with an unauthorized tool. Only an authorized key, such as the security key 20, may be used to effect fastener removal.

Sixth Example Embodiment

Turning now to FIGS. 25 and 26, a nut-type security fastener 502 according to a sixth example embodiment is shown. The nut fastener 502 has many of the features of the nut fastener 102 described above in connection with FIGS. 12 and 13. This similarity is indicated by the use of corresponding reference numbers for the various fastener features, with each corresponding reference number being incremented by 400. The major difference between the nut fastener 502 and the nut fastener 102 lies in the fact that the former has the same security features as the bolt fastener 402 described above. Thus, in the nut fastener 502, the lock post 510 may or may not have a breakaway construction (with FIG. 25 showing the non-breakaway option) and the cap 512 is a close-ended (or open-ended) free-spinning cap (spin cap). The spin cap 512 thus represents a security structure of the fastener 502. If removal of the nut fastener 502 is attempted by gripping the first end portion 504 using an unauthorized tool, the spin cap 512 will simply spin without rotating the fastener. It will be appreciated that the nut fastener 502 may be used in any of the installations shown in FIGS. 15-20 (described above in connection with the nut fastener 102), and will provide similar security features, the only difference being that the lock post 510 may or may not be configured to separate from the remainder of the fastener. Moreover, the spin cap 512 will freely spin on the lock post 510 if an attempt is made to remove the nut fastener 502 by gripping the first end portion 504 with an unauthorized tool. Only an authorized key, such as the security key 20, may be used to effect fastener removal.

Seventh Example Embodiment

Figure 27:
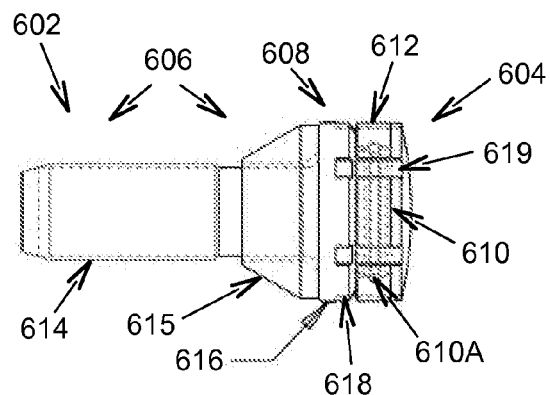
FIG. 27 is a side view showing a security fastener according to a seventh example embodiment.
Figure 28:
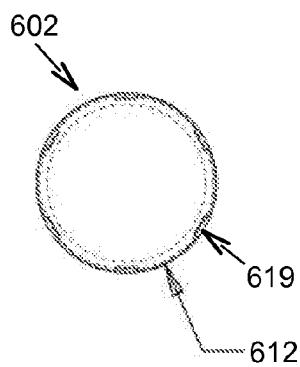
FIG. 28 is an end view showing the security fastener of FIG. 27.

Turning now to FIGS. 27 and 28, a bolt-type security fastener 602 according to a seventh example embodiment is shown. The bolt fastener 602 is substantially identical to the bolt fastener 402 described above in connection with FIGS. 23 and 24. This similarity is indicated by the use of corresponding reference numbers for the various fastener features, with each corresponding reference number being incremented by 200. The major difference between the bolt fastener 602 and the bolt fastener 402 lies in the fact that it has a modified spin cap 612. The spin cap 612 differs from the spin cap 412 in that it has a width dimension that is at least as large as a maximum width of the fastener's medial portion 608. In the bolt fastener 602, this is the sidewall 616. The spin cap 612 also has a key-receiving spin cap pattern comprising a set of longitudinally-extending, circumferentially arranged pattern grooves 619 formed the spin cap's side wall region. The spin cap grooves 619 are configured in number, size and shape to match only the lock pattern grooves 618 on the fastener's medial portion 608. The spin cap grooves 619 will line up with the lock pattern grooves 618 when the spin cap 612 is in the correct rotational position. This allows a key (such as the security key 20) whose key pattern matches the lock pattern 618 to be introduced over the spin cap 619 and advanced into engagement with the lock pattern grooves 618. The spin cap 612 will permit such a matching security key to reach the lock pattern grooves 618 but will block other types of key from doing so. Unless the lock pattern grooves 618 are aligned with the corresponding spin cap grooves 619, they will be prevented from reaching the lock pattern grooves 618 by the enlarged diameter of the spin cap 612.

Figure 29:
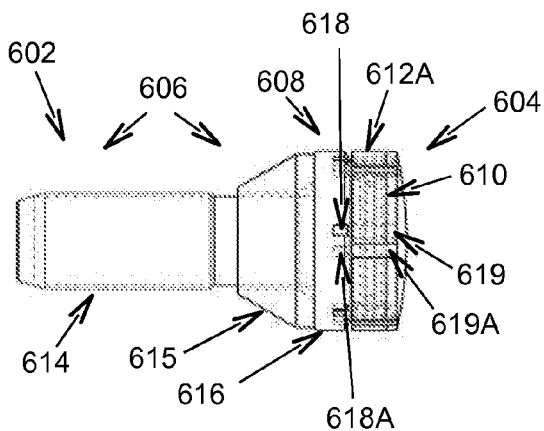
FIG. 29 is a side view showing a modification of the security fastener of FIG. 27.
Figure 30:
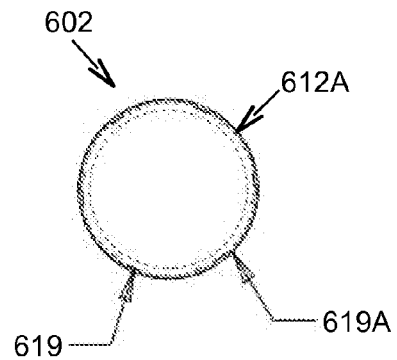
FIG. 30 is an end view showing the modification of FIG. 29.

It should be noted that the spin cap 619 can only be used on bolt fasteners 602 whose lock pattern grooves 618 are arranged in a pattern that exactly matches the spin cap grooves 619. This requires that a separate spin cap configuration be manufactured for each different lock pattern. In order to reduce the number of different spin cap configurations that must be produced, a modified spin cap 612A may be used, as shown in FIGS. 29 and 30. According to this design, the spin cap 612A is formed with more than one set of spin cap grooves. For example, it may have the original set of spin cap grooves 619 described above plus an additional set of spin cap grooves 619A. The original spin cap grooves 619 are configured in number, size and shape to match the lock pattern grooves 618. The additional spin cap grooves 619A are configured in number, size and shape to match other lock pattern grooves on other fasteners having different lock patterns. As an alternative to using two sets of spin cap grooves, a single set of grooves could be provided that are wider (or of different shape) than the lock pattern grooves, for example, perhaps as wide as two or three lock pattern grooves. This approach would allow a single spin cap configuration to be used with different lock patterns.

It will be appreciated that the bolt fastener 602 may be used in any of the installations shown in FIGS. 6-11 (described above in connection with the bolt fastener 2), and will provide similar security features, the only difference being that the lock post 610 is not configured to separate from the remainder of the fastener. Instead, the spin cap 612 will freely spin on the lock post 610 if an attempt is made to remove the bolt fastener 602 by gripping the first end portion 604 with an unauthorized tool. Only an authorized key, such as the security key 20, may be used to effect fastener removal. In addition, the spin cap design features of the bolt fastener 602 could also be incorporated in a nut fastener (not shown). Such as nut fastener could then be used in any of the installations shown in FIGS. 15-20 (described above in connection with the nut fastener 102).

Eighth Example Embodiment

Figure 31:
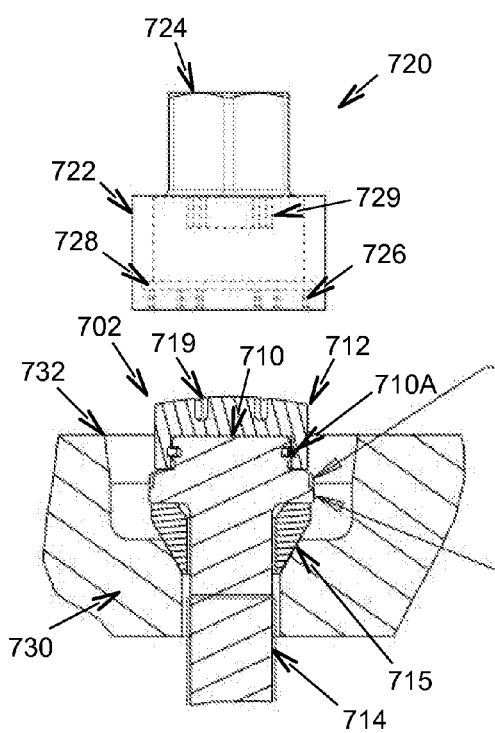
FIG. 31 is a cross-sectional view showing a security fastener according to a eighth example embodiment.
Figure 32:
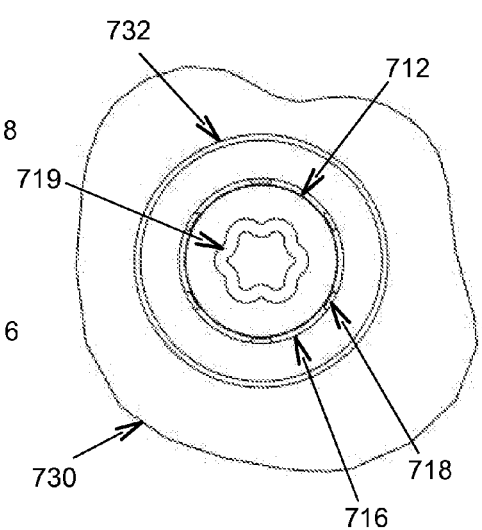
FIG. 32 is an end view showing the security fastener of FIG. 31.

Turning now to FIGS. 31 and 32, a bolt-type security fastener 702 according to a seventh example embodiment is shown. The bolt fastener 702 is similar to the bolt fastener 602 described above in connection with FIGS. 27 and 28. This similarity is indicated by the use of corresponding reference numbers for the various fastener features, with each corresponding reference number being incremented by 100. The major difference between the bolt fastener 702 and the bolt fastener 602 lies in the design of the spin cap 712. The spin cap 712 does not have a large diameter or longitudinally extending spin cap grooves like the spin cap 612. Instead, the spin cap 712 is longer and its end face is formed with a different type of a key-receiving spin cap pattern. Instead of a spin cap pattern provided by longitudinally extending grooves, the spin cap pattern of the spin cap 712 comprises a face pattern 719 on the face of spin cap. The spin cap face pattern 719 is configured as a closed (or open) curvilinear groove. A mating security key 720 is similar in most respects to the security key 20, as indicated by the use of corresponding reference numbers incremented by 700. In addition, the security key 720 is formed with a secondary key pattern 729 at the base of its socket 722. The security key pattern 729 is configured as a curvilinear ridge that matches the spin cap's curvilinear face pattern 719. The length of the spin cap 712 is such that the key's primary key pattern lobes 726 will not reach bolt fastener's lock pattern grooves 718 unless the secondary key pattern 729 is seated in the spin cap face pattern 719. An unauthorized key with a non-matching secondary key pattern may not be used to actuate the bolt fastener 702. Its non-matching secondary key pattern will be refused engagement by the spin cap face pattern 719 and the primary key pattern lobes 726 will not be able to reach the lock pattern grooves 718. As shown in FIG. 31, if the bolt fastener 702 is installed in a wheel 730 having a recess hole 732, only the security key 720 can be used to remove it.

The installation shown in FIGS. 31 and 32 is identical to the installation shown in FIGS. 6 and 7 (described above in connection with the bolt fastener 2). It will likewise be appreciated that the bolt fastener 702 may be used in either of the other two installations described in relation to the bolt fastener 2, namely, the installations shown in FIGS. 8-11. The bolt fastener 702 will provide similar security features, the only difference being that the lock post 710 is not configured to separate from the remainder of the fastener. Instead, the spin cap 712 will freely spin on the lock post if an attempt is made to remove the bolt fastener 702 by gripping the first end portion 704 with an unauthorized tool. Only an authorized key, such as the security key 720, may be used to effect fastener removal. In addition, the spin cap design features of the bolt fastener 702 could also be incorporated in a nut fastener (not shown). Such as nut fastener could then be used in any of the installations shown in FIGS. 15-20 (described above in connection with the nut fastener 102).

Accordingly, various security fasteners for installation on wheels having a recess hole have been disclosed. Although example embodiments have been shown and described, it should be apparent that many variations and alternative embodiments could be implemented in accordance with the teachings herein. It is understood, therefore, that the invention is not to be in any way limited except in accordance with the spirit of the appended claims and their equivalents.

What is claimed is:

1. A security fastener installation on a wheel having a recess hole, comprising:
   a wheel having a recess hole;
   a security fastener installed in said recess hole, said security fastener including:
   a first end portion;
   said first end portion being arranged so that it is exposed outside, at or inside an entrance to said recess hole;
   said first end portion comprising a first security feature that prevents said fastener from being removed from said recess hole should an attempt be made to rotate said fastener by gripping said first end portion;
   said first security feature comprising a security structure selected from the group consisting of (1) a post providing an area of weakness on said first end portion that prevents said fastener from being rotated and removed from said recess hole by gripping said post with an unauthorized tool, and (2) a combination of said post providing said area of weakness on said first end portion and a rotatable cap on said post;
   said post having a free end, a base end comprising a reduced diameter section providing said area of weakness, and an exterior surface and an internal bore that are both generally cylindrical in shape from said reduced diameter section at said base end to said free end of said post;

a medial portion of said fastener;

a key-receiving lock pattern on said medial portion;

said medial portion being arranged so that a side wall region thereof extends within said recess hole with a defined circumferential gap space of reduced size selected to provide a second security feature that prevents said fastener from being removed from said recess hole should an attempt be made to rotate said fastener by gripping said side wall region, and said lock pattern being exposed outside, at or inside said entrance to said recess hole;

a second end portion comprising a thread pattern, said second end portion being arranged so that it is disposed deeper in said recess hole than said medial portion; and said first end portion, said medial portion, and said second end portion being centered on a common longitudinal axis.

2. A fastener installation in accordance with claim 1, wherein said fastener comprises a nut.

3. A fastener installation in accordance with claim 1, wherein said wheel comprises a metal alloy vehicle wheel.

4. A fastener installation in accordance with claim 1, wherein said circumferential gap space is too small to receive gripping tools capable of applying sufficient torque to remove said fastener.

5. A fastener installation in accordance with claim 1, wherein said circumferential gap space is too small to receive standard socket wrench sockets.

6. A fastener installation in accordance with claim 1, wherein said circumferential gap space is not more than approximately three millimeters.

7. A security fastener for installation on a wheel having a recess hole, comprising:

a first end portion having a cap;

said first end portion comprising a generally cylindrical breakaway post on which said cap is mounted, said post being configured to break away from a remainder of said fastener and thereby prevent said fastener from being rotated and removed from an installation by gripping said post with an unauthorized tool; and an external key-receiving lock pattern provided on a second portion of said fastener that is not covered by said cap.

8. A fastener in accordance with claim 7, wherein said cap is rotatably mounted on said post.

9. A fastener in accordance with claim 7, wherein said cap comprises a shape that is one of rounded, hexagonal, square or other shape.

10. A fastener in accordance with claim 7, wherein said cap comprises a first metal, said post comprises a second metal, and said fastener further comprises a non-metal intermediate cap disposed between said cap and said post to prevent bimetallic corrosion.

11. A fastener in accordance with claim 10, wherein said fastener second portion also comprises said second metal and a separation gap is maintained between said cap and said fastener second portion to further prevent bimetallic corrosion.

12. A fastener, comprising:

a fastener body having a first end portion, a second end portion and an intermediate portion between said first and second end portions;

a generally cylindrical post having a free end, a base end comprising a reduced diameter section, and an exterior surface and an internal bore that are both generally cylindrical in shape from said reduced diameter section at said base end to said free end of said post, said reduced diameter section providing an area of weakness on said first end portion that prevents said fastener from being rotated and removed from an installation by gripping said post with an unauthorized tool;

a lock pattern on said intermediate portion;

said intermediate portion being radially enlarged relative to said post to provide an annular front face, and said lock pattern intersecting said annular front face such that said lock pattern is accessible by a key that fits over said post; and a thread pattern on said second end portion.

13. A fastener in accordance with claim 12, further including a cap on said post.

14. A fastener in accordance with claim 13, wherein said cap is rotatable on said post.

15. A fastener comprising a generally cylindrical post having a free end, a base end and said post being generally cylindrical along its entire length from said base end to said free end thereof, said post further comprising an external groove at said base end and an internal generally cylindrical bore extending from said external groove at said base end to said free end of said post, said bore providing an area of weakness that allows said post to distort and prevent said fastener from being rotated and removed from an installation by gripping said post with an unauthorized tool.

16. A fastener comprising a generally cylindrical breakaway end portion covered by a substantially non-removable, close-ended cap, a medial portion, and a threaded portion, and said end portion being configured to break away from said fastener and thereby prevent said fastener from being rotated and removed from an installation by gripping said post with an unauthorized tool.

* * * * *